(12) United States Patent
Krey

(10) Patent No.: US 11,263,311 B2
(45) Date of Patent: Mar. 1, 2022

(54) SECURING VIRTUAL-MACHINE SOFTWARE APPLICATIONS

(71) Applicant: Promon AS, Oslo (NO)

(72) Inventor: Jan Vidar Krey, Ski (NO)

(73) Assignee: Promon AS, Oslo (NO)

( * ) Notice: Subject to any disclaimer, the term of this patent is extended or adjusted under 35 U.S.C. 154(b) by 0 days.

(21) Appl. No.: 17/270,659

(22) PCT Filed: Feb. 14, 2020

(86) PCT No.: PCT/EP2020/053985
§ 371 (c)(1),
(2) Date: Feb. 23, 2021

(87) PCT Pub. No.: WO2020/165447
PCT Pub. Date: Aug. 20, 2020

(65) Prior Publication Data
US 2021/0224378 A1    Jul. 22, 2021

(30) Foreign Application Priority Data
Feb. 15, 2019  (GB) ...................... 1902109

(51) Int. Cl.
*G06F 21/53*  (2013.01)
*G06F 9/445*  (2018.01)
(Continued)

(52) U.S. Cl.
CPC .............. *G06F 21/53* (2013.01); *G06F 9/445* (2013.01); *G06F 9/45533* (2013.01); *G06F 21/14* (2013.01); *G06F 2221/033* (2013.01)

(58) Field of Classification Search
CPC ...... G06F 21/53; G06F 9/445; G06F 9/45533; G06F 21/14; G06F 2221/033
See application file for complete search history.

(56) References Cited

U.S. PATENT DOCUMENTS

| 8,595,752 B1 * | 11/2013 | Fioravanti | ............... | G06F 9/544 |
| | | | | 719/328 |
| 10,754,680 B2 | 8/2020 | El-Moussa et al. | | |

(Continued)

FOREIGN PATENT DOCUMENTS

| CN | 102831342 | 1/2016 |
| WO | 2015/149214 | 10/2015 |
| WO | 2017/129530 | 8/2017 |

OTHER PUBLICATIONS

Yan et al. SplitDroid: Isolated Execution of Sensitive Components for Mobile Applications, [online], pp. 1-18. Retrieved From the Internet <https://www.researchgate.net/publication/309149711_SplitDroid_Isolated_Execution_of_Sensitive_Components_for_Mobile_Applications> (Year: 2015).*

(Continued)

*Primary Examiner* — Emerson C Puente
*Assistant Examiner* — Jonathan R Labud
(74) *Attorney, Agent, or Firm* — Diedericks & Whitelaw, PLC.

(57) ABSTRACT

A computer-implemented method for generating a secured software application, involves receiving a source software application which has instructions for processing by a process virtual machine. The method involves generating a secured software application comprising a first set of bytecode instructions derived from the source software application, a second set of the bytecode instructions derived from the source software application, and a security component. The first set of bytecode instructions are for processing on a first process virtual machine, in a first process, on a target processing system. The security component comprises instructions which, when executed on the target processing system, will cause the target processing system to provide a second process virtual machine in a second process where it (Continued)

will process instructions from the second set of bytecode instructions.

30 Claims, 8 Drawing Sheets

(51) Int. Cl.
    *G06F 9/455* (2018.01)
    *G06F 21/14* (2013.01)

(56) References Cited

U.S. PATENT DOCUMENTS

| | | | |
|---|---|---|---|
| 2007/0050764 A1* | 3/2007 | Traut | G06F 9/45558 718/1 |
| 2010/0064367 A1 | 3/2010 | Hansen | |
| 2014/0137184 A1* | 5/2014 | Russello | H04L 63/20 726/1 |
| 2017/0024230 A1 | 1/2017 | Li et al. | |
| 2017/0116410 A1* | 4/2017 | Wajs | G06F 8/70 |
| 2017/0124306 A1 | 5/2017 | Wang et al. | |
| 2017/0262355 A1* | 9/2017 | Liu | G06F 11/3636 |

OTHER PUBLICATIONS

"Android: How to fork a new process", https://stackoverflow.com/questions/8970342/android-how-to-fork-a-new-process Oct. 2014.

"Android native code fork() has issues with IPC/Binder", https://stackoverflow.com/questions/26309046/android-native-code-fork-has-issues-with-ipc-binder Oct. 2014.

Ehringer, "The Dalvik Virtual Machine Architecture", Mar. 2010.

"Hosting an executable within Android Application", https://stackoverflow.com/questions/5583487/hosting-an-executable-within-android-application Apr. 2011.

"Promon Shield Whitepaper Threats, Security Concepts and Features". *Promon*, Accessed Jan. 2017.

"Run native executable in Android App", http://gimite.net/en/index.php?Run%20native%20executable%20in%20Android%20App Accessed Dec. 2018.

"Runtime", *Android Developers*, https://developer.android.com/reference/java/lang/Runtime?authuser=3&hl=vi Accessed Dec. 2018.

"<uses-sdk>". *Android Developers*, https://developer.android.com/guide/topics/manifest/uses-sdk-element#min Accessed Nov. 2018.

* cited by examiner

SECURING VIRTUAL-MACHINE SOFTWARE APPLICATIONS

CROSS-REFERENCE TO RELATED APPLICATIONS

This application represents the U.S. National Phase of International Application number PCT/EP2020/053985 entitled "Securing Virtual-Machine Software Applications" filed 14 Feb. 2020, which claims benefit to Great Britain Application number 1902109.6 filed 15 Feb. 2019, all of which are incorporated herein by reference.

BACKGROUND OF THE INVENTION

This invention relates to methods, software and computing apparatus for improving the security of software applications developed for execution in virtual-machine environments.

Many popular computing devices support process virtual machines (sometimes called managed runtime environments) which can process software applications comprising bytecode instructions (e.g., Java™ bytecode). The process virtual machine typically runs in its own process (execution environment) and allows the same instructions to be executed on a variety of different hardware platforms by abstracting away details of the underlying hardware. The use of such virtual machines (VM) can therefore simplify software development and distribution, compared with developing applications in native object code, which will typically work only on a specific processor type.

Examples of process virtual machines include the Java™ virtual machine, which is supported by Android™ smartphones, and the .NET Framework Common Language Runtime virtual machine, provided on Microsoft™ Windows™ platforms. On recent Android™ operating systems, each Android™ Java™ app (in Dalvik™ bytecode) is processed by a respective Android™ Runtime (ART) virtual machine which executes within the runtime execution environment of a respective Linux™ process.

A virtual machine may interpret bytecode in real-time, or it may pre-compile the bytecode to platform-specific native code; such compiling may be performed when the app is installed (referred to as Ahead-of-Time (AOT) compilation) or shortly before execution (referred to as Just-in-Time (JIT) compilation).

The popularity of the Android environment has led to large numbers of applications ("apps") being developed for this platform, which provide a wide variety of functions. However, this increases the risk and potential impact of any security breaches, especially when applications are handling sensitive information and operations, such as processing financial transactions, medical records, etc.

While the use of process virtual machines can provide some inherent security due to the sand-boxing provided by each virtual machine, which may be sufficient for some apps such as computer games, other software developers and distributers, such as financial institutions, desire a higher level of security, to lessen the risk of their sensitive data, or their customers' sensitive data, being compromised.

The present invention provides a novel approach for improving the security of a software application that is intended to be executed on a process virtual machine.

SUMMARY OF THE INVENTION

From a first aspect, the invention provides a computer-implemented method for generating a secured software application, the method comprising:

receiving a source software application that comprises instructions for processing by a process virtual machine; and generating a secured software application comprising a first set of bytecode instructions derived from the source software application, a second set of the bytecode instructions derived from the source software application, and a security component, wherein the first set of bytecode instructions are for processing on a first process virtual machine, in a first process, on a target processing system, and wherein the security component comprises instructions which, when executed on the target processing system, will cause the target processing system to:

provide a second process virtual machine in a second process; and process instructions from the second set of bytecode instructions on the second process virtual machine.

From a further aspect, the invention provides a software tool for generating a secured software application, the software tool comprising instructions for:

receiving a source software application that comprises instructions for processing by a process virtual machine; and generating a secured software application comprising a first set of bytecode instructions derived from the source software application, a second set of the bytecode instructions derived from the source software application, and a security component, wherein the first set of bytecode instructions are for processing on a first process virtual machine, in a first process, on a target processing system, and wherein the security component comprises instructions which, when executed on the target processing system, will cause the target processing system to:

provide a second process virtual machine in a second process; and process instructions from the second set of bytecode instructions on the second process virtual machine.

From a further aspect, the invention provides apparatus for generating a secured software application, the apparatus comprising a memory and one or more processors, wherein:

the apparatus comprises an input for receiving a source software application that comprises instructions for processing by a process virtual machine; and the memory stores software instructions for generating a secured software application from the source software application, wherein the generated secured software application comprises a first set of bytecode instructions derived from the source software application, a second set of the bytecode instructions derived from the source software application, and a security component, wherein the first set of bytecode instructions are for processing on a first process virtual machine, in a first process, on a target processing system, and wherein the security component comprises instructions which, when executed on the target processing system, will cause the target processing system to:

provide a second process virtual machine in a second process; and process instructions from the second set of bytecode instructions on the second process virtual machine.

From a further aspect, the invention provides a secured software application comprising a first set of bytecode instructions, a second set of bytecode instructions, and a security component, wherein the first set of bytecode instructions are for processing on a first process virtual machine, in a first process, on a target processing system, and wherein the security component comprises instructions which, when executed on the target processing system, cause the target processing system to:

provide a second process virtual machine in a second process; and process instructions from the second set of bytecode instructions on the second process virtual machine.

From a further aspect, the invention provides a method of executing a secured software application on a processing system, wherein the secured software application comprises a first set of bytecode instructions, a second set of bytecode instructions, and a security component, the method comprising the processing system:

processing instructions from the first set of bytecode instructions on a first process virtual machine in a first process;

executing instructions from the security component that cause the processing system to provide a second process virtual machine in a second process; and processing instructions from the second set of bytecode instructions on the second process virtual machine.

From a further aspect, the invention provides a processing system for executing a secured software application, wherein the processing system comprises a memory and one or more processors, wherein the memory stores a secured software application comprising a first set of bytecode instructions, a second set of bytecode instructions, and a security component, wherein the first set of bytecode instructions are for processing on a first process virtual machine, in a first process, on the processing system, and wherein the security component comprises instructions which, when executed on the processing system, cause the processing system to:

provide a second process virtual machine in a second process; and process instructions from the second set of bytecode instructions on the second process virtual machine.

Further aspects provide transitory media (e.g., radio signals) and non-transitory media (e.g., magnetic or semiconductor memories) storing software tools or secured software applications as disclosed herein.

Thus it will be seen that, in accordance with the invention, a secured application can be created from a source software application by introducing a security component that causes part of the source bytecode (e.g., classes that handle sensitive data) to be processed within a second virtual machine (VM), created by the security component. This second VM runs in its own process, separate from the first VM, and can therefore be shielded from attacks on the first VM. Less sensitive bytecode from the source application (e.g., less sensitive classes) may be executed in the first VM, while more sensitive bytecode may be processed by the second VM. Dividing the bytecode into sensitive and less-sensitive bytecode, and processing the sensitive bytecode in its own virtual machine which is provided by the secured application, can substantially reduce the ability of an attacker to perform a dynamic analysis of the sensitive bytecode during runtime, by isolating the execution of the sensitive bytecode from the processing of the less-sensitive code.

The first virtual machine may be provided by an operating system, firmware or other software executing on the target processing system. The instructions for providing the first virtual machine may thus have been installed on the processing system before the secured software application is loaded and/or installed on the system.

The target processing system may comprise hardware (e.g., one or more processors, memory, inputs, outputs, etc.) and/or software (e.g., an operating system, such as an Android™, Microsoft™ Windows™, or Apple™ iOS™ operating system). It may be a mobile telephone/cellphone, tablet, personal computer, server farm, domestic or industrial appliance, vehicle, sensor device, or any other electronic processing system.

The first virtual machine may be a Java™ virtual machine. It may be provided by an Android™ operating system. It may be a fork of the Android™ zygote process. It may be a Dalvik™ or ART virtual machine.

The first virtual machine may directly interpret instructions from the first set of bytecode instructions (e.g., using a switch statement), or it may compile some or all of the instructions to machine code before the instructions are executed; this compilation may be performed JIT or AOT.

The first process may provide a first execution environment on the target processing system. The first process virtual machine may be created in order to process instructions from the first set of bytecode instructions. It may exist only to process instructions from the secured application (and any core libraries provided with the virtual machine). It may be configured not to process instructions from any other bytecode applications that may be installed on the system.

The security component may comprise native code (e.g., ARM™ or x86 machine code) packaged within the secured application. The security component may comprise both bytecode and native (machine) code.

The security component may comprise one or more instructions that, when executed in the first process, cause the target processing system to create the second process.

The second process may be created as a copy or clone of the first process, or may be otherwise spawned from the first process. The second process may be created as a fork from the first process. Thus the security component may comprise a fork instruction—e.g., a native-code fork system call to a Linux™ kernel.

The first and second processes may provide different respective execution environments. The security component may comprise one or more instructions for clearing and/or re-initialising some or all of the memory associated with the second process. In this way, the second process can be protected from dangerous content that may be residing in the memory of the first process (such as malicious software). In some embodiments, this may be achieved by clearing some or all program code from memory associated with the second process (i.e. code inherited from the first process) and/or loading new program code for the second process. In a Linux™-based processing system, both actions may be accomplished together by an exec( ) operation, which the security component may be configured to call. The new program code may be wholly or partly contained in the security component of the secured software application.

The security component may comprise instructions that define or implement the second virtual machine. The security component may comprise instructions for interpreting or for compiling bytecode, including for interpreting and/or compiling bytecode from the second set of bytecode in the secured software application. These interpreting or compiling instructions may be provided as native code for the target processing system.

In some embodiments, the security component may contain a plurality of sets of such interpreting or compiling instructions, compiled for different respective target processing systems (e.g., for processors having different instruction sets—e.g., ARM™, ARM64™ and/or x86). This can enable copies of the secured application to be run on a plurality of different processing systems.

The first and second virtual machines are preferably configured to process the same bytecode instruction sets. However, they are preferably implemented independently. In particular, the second virtual machine (or the second process) is preferably not a clone of the first virtual machine (or the first process)—e.g., not spawned from the same zygote—but is preferably provided by the secured software application itself, i.e. by the security component. Thus, in some embodiments, the second VM uses different bytecode-interpretation or bytecode-compilation instructions from the interpretation or compilation instructions used by the first VM.

The secure application may be configured so that the second VM only interprets bytecode instructions from the second set of bytecode instructions from the source application. The secure application may be configured to prevent interpretation of any other bytecode instructions. The second virtual machine may comprise logic for checking that bytecode instructions are from the second set of bytecode instructions before processing the bytecode instructions. It may comprise instructions for checking that bytecode instructions satisfy a security criterion, such as having been encrypted with a predetermined encryption key. It may reject bytecode instructions that do not satisfy the security criterion.

The first virtual machine may have a debugging interface. However, the second virtual machine preferably provides no debugging interface. In this way, the second virtual machine can prevent code-injection via a debugging interface. This can allow it to process sensitive code more securely.

The second set of bytecode instructions may be stored as encrypted data when the secured software application is not being executed. These instructions may already be encrypted when the secured application is loaded onto the target processing system. The secured application may be configured so that the second set of bytecode instructions are never stored unencrypted in a memory of the target processing system outside the second process (and any child processes of the second process). The security component may comprise a decryption routine for decrypting the encrypted bytecode (e.g., as part of the second VM). It may store a decryption key for use in a decryption algorithm. The second VM may decrypt bytecode instructions as it processes the bytecode for interpretation or compilation, rather than ahead of time. Such use of encryption can help to prevent static analysis of the secured application from revealing sensitive information.

The security component may comprise instructions that cause the target processing system to check the integrity of the second process or execution environment. It may be configured to verify that some or all memory allocated to the second virtual machine does not contain unrecognised or unauthorised code (e.g., code which may have been placed in the memory by an attacker). It may halt execution of the software application, or perform some other action such as alerting a user, if a possible intrusion is detected. It may be configured to perform a self-integrity check repeatedly at intervals—e.g., at regular intervals measured by a timer.

The security component may provide independent implementations of one or more frameworks or libraries already provided by the target processing system (e.g., one or more standard Java™ or Linux™ libraries provided by the Android™ operating system). In some embodiments, every framework and/or system library used by the second process may be provided by the security component. This can mitigate the threat presented by a compromised framework or library that might be present on the target processing system.

The security component may comprise instructions that cause the target processing system to provide one or more proxy components (e.g., classes) on the first or second VM. The proxy components may be arranged to allow bytecode on one of the first and second VMs to access a function or object on the other of the first and second VMs. Each component or class in the second set of bytecode instructions that is accessed by bytecode in the first set of bytecode may have a respective proxy component or class on the first VM. The proxy component may declare the same public methods as the corresponding component in the second set of bytecode. However, the proxy component may implement its methods as remote function calls to the corresponding component in the second set of bytecode.

The secured application may be designed to be installed and loaded as a conventional software application on the target processing system—e.g., as a conventional Android™ app.

The first set of bytecode instructions may perform non-sensitive operations, while the second set of bytecode instructions may perform one or more security-sensitive operations, such as storing or processing a private cryptography key or financial data.

The instructions received in the source software application that are for processing by a process virtual machine may be received as bytecode instructions or may be received in a human-readable language such as Java™. The source software application may be an Android™ application. The first and second sets of bytecode instructions may, between them, comprise all, or at least 75% or 90% or 99%, of the bytecode instructions from the source software application, or of the bytecode instructions to which the source application would compile it were compiled conventionally, without adding the security component. The security component may comprise additional bytecode instructions, not in the source application, e.g., for providing proxy classes and/or for invoking native code that provides the second VM. In some cases, the source application may additionally comprise native code; this native code may be retained substantially unmodified in the secured application.

The method of executing a secured software application on a target processing system may comprise loading or installing the secured software application onto the target processing system—e.g., downloading and installing the application over a wired or wireless communication channel.

The method for generating a secured software application may comprise receiving configuration information, such as a configuration file, that distinguishes between instructions belonging to the first set of bytecode instruction and instructions belonging to the second set of bytecode instructions. It may identify, explicitly or implicitly, a first set of instructions from the source software application to include in the first set of bytecode instruction, and may identify, explicitly or implicitly, a second set of instructions from the source software application to include in the second set of bytecode instruction. Some or all instructions from the source application may be included in the secured application without transformation, or they may be transformed e.g., by being compiled to bytecode, or by inserting references to one or more proxies. The configuration information may identify one or more classes, routines, or other program components, for inclusion in the second set of bytecode instructions, or it may identify one or more classes, routines, or other program components, for inclusion in the first set of bytecode instructions. The software tool may be configured to receive such configuration information; it may use it to determine which instructions to include in the first set of bytecode instructions and which to include in the second set of bytecode instructions.

The software tool for generating a secured software application may be configured to receive bytecode instructions—i.e., pre-compiled instructions, rather than human-readable instructions. It may execute independently of a compiler for generating the source software application—e.g., on separate apparatus. This allows the process of adding security to a source software application to be performed at a later time and/or in a different location and/or by a different party, from the earlier compiling of the source software application, which may be advantageous in some circumstances.

However, this is not essential and, in other embodiments, the software tool may additionally comprise a compiler for compiling a human-readable language (e.g., Java™) to bytecode.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
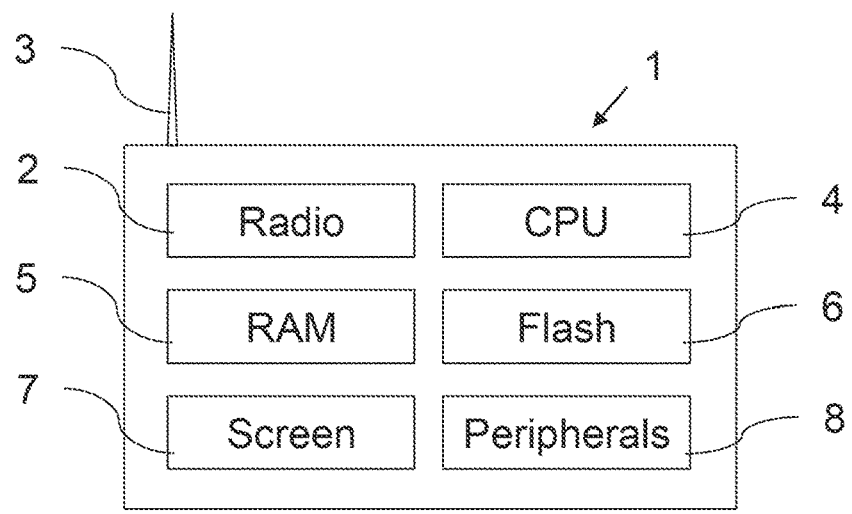
FIG. 1 is a schematic diagram of a conventional smartphone suitable for executing software embodying the invention.

FIG. 1 shows a conventional table or smartphone 1 suitable for executing software embodying the invention. It has a radio 2 and antenna 3 for communicating with a mobile telecommunications network and/or a local radio network (e.g., a WiFi network). A central processing unit (CPU) 4 executes software from RAM 5 and/or flash memory 6. The smartphone 1 has a screen 7 and other peripherals 8 which may provide support user interfaces, timers, I/O, hardware acceleration, and other hardware operations.

This is just one example of hardware for executing software applications embodying the invention. The invention may be implemented on embedded devices and microcontrollers (e.g., in an Internet of Things sensor), personal computers, laptops, industrial machinery, on any other suitable device or system which supports a virtual-machine software architecture.

Figure 2:
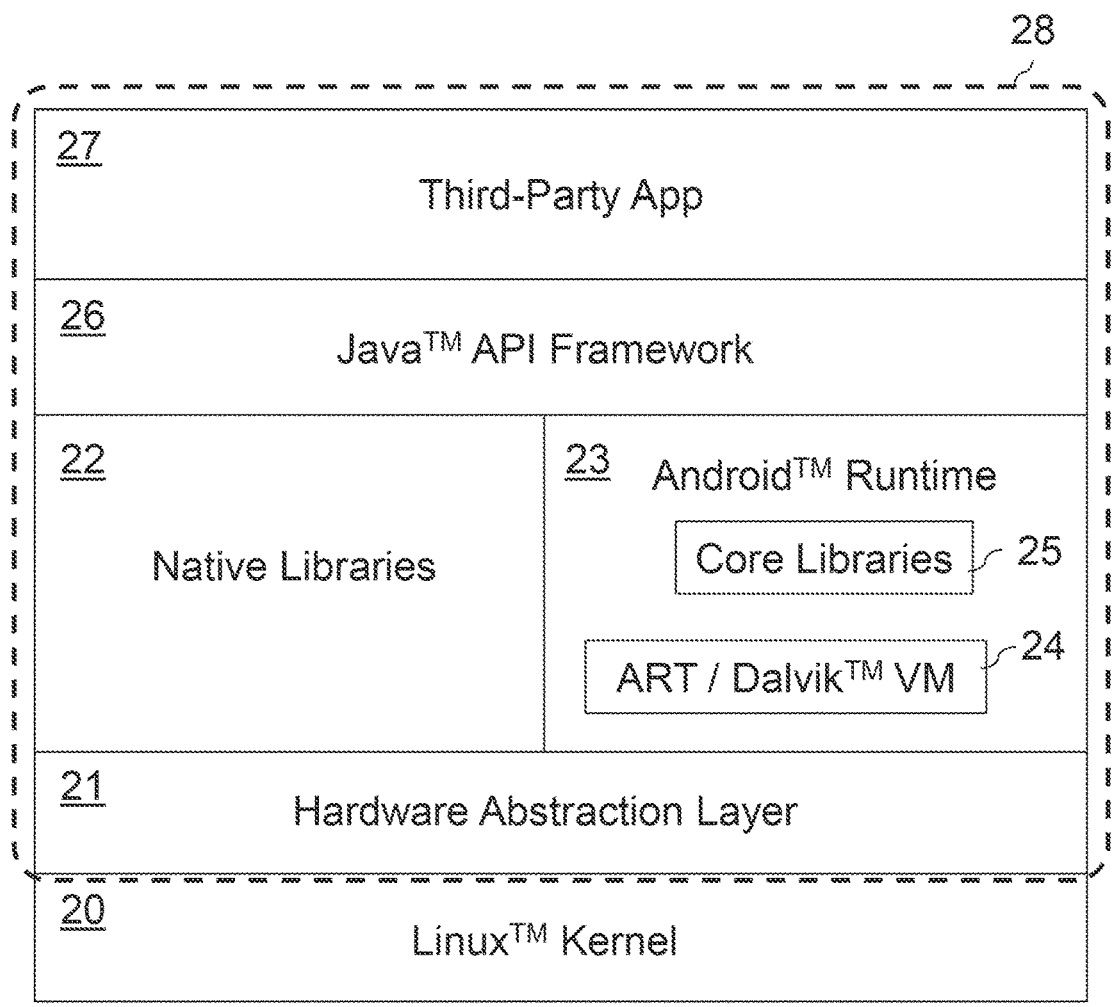
FIG. 2 is a schematic diagram of the Android™ software architecture.

FIG. 2 shows a conventional Android™ software architecture on which a conventional $3^{rd}$-party app is loaded. A Linux™ kernel 20 provides the foundation for the Android™ platform, providing functions such as thread control for the CPU 4, management of the memory 5, 6, and drivers for the radio 2 and other peripherals 8. Above this, a hardware abstraction layer (HAL) 21 provides a device-independent interface for accessing various hardware functions such as audio, wireless communication, sensors, etc.

The Android™ Runtime 23 includes code for providing Java-like virtual machines (VM) 24, as well as a set of core runtime libraries 25. Android™ versions prior to 5.0 provided a Dalvik™ process virtual machine (VM) for interpreting a form of Java™ bytecode; it supports real-time interpretation of bytecode, and well as Just-in-Time (JIT) compilation of bytecode to machine code, for faster execution, just prior to execution. Android™ 5.0 onwards replaces Dalvik™ with the Android™ Runtime (ART); this performs ahead-of-time (AOT) compilation of bytecode when an application is installed, which converts the entire application into native machine code upon installation, which is subsequently executed by the device's runtime environment. When executed, each app runs in its own process and with its own instance of the ART.

More generally, bytecode in software applications embodying the invention may be processed on any suitable platform, and may be at least partly interpreted in real time, or may be at least partly JIT compiled, or may be at least partly AOT compiled, or any combination of these. The term "processing" bytecode, as used herein, may cover any of these options.

Returning to FIG. 2, the HAL 21 and Android™ Runtime 23 are, themselves, built with native code and make use of native libraries 22; these libraries are typically written in C and C++ and compiled for the specific CPU 4.

The Java™ API Framework 26 provides frequently-used components and services which can be accessed by system apps and third-party apps. These provide operations such as displaying user-interface components, sharing data between apps, managing app lifecycle, etc. Android™ comes with built-in system apps for email, web browsing, contacts, etc. (not shown in FIG. 2). Other third-party apps 27 can be loaded by a user—e.g., by downloading them from the Google™ Play store or other sources.

When an exemplary third-party app 27, as shown in FIG. 2, is executed, it is run as a single process 28, owned by the Linux™ kernel 20. This process 28 typically executes at least some instructions from each of: the third-party app 27 itself, the Java™ API Framework 26, the Android Runtime 23, native libraries 22 and the hardware abstraction layer (HAL) 21.

A third-party app 27 may be trusted by a user to store and process important confidential information such as credit card numbers, medical records, banking transactions, cryptographic keys, etc. This can make such apps a target for hackers who desire to steal or manipulate this information—e.g., to perform an unauthorised bank transfer.

A significant security threat in Android™ is the easy access to decompilers to analyse the source code of an Android™ application. This threat is often referred to as static analysis. Various obfuscating tools offer strategies to obfuscate source code to make static analysis of the source code harder, but it is still feasible to reverse the obfuscation if the rules of the obfuscation are known. In addition to static analysis there are also hooking frameworks which allow an attacker to inspect application code at runtime. This is called dynamic analysis.

Using embodiments of the present invention, an application can be processed off the device 1, before it is installed, so that it becomes more secure against dynamic analysis. An application (app) that has been processed in this way will be referred to herein as a "secured" application. The secured application can be protected from dynamic analysis by being enabled to detect hooking frameworks and attempts to modify the secured application. Once the novel security component has been added to the application, it cannot be removed by an attacker.

A further security challenge in Android™, as with other Operative Systems which attempt to secure applications by emulating virtual machines (VM) for each app, is the dependency on the VM master image spawner (e.g., the Android™ zygote) as well as on platform libraries 25 which are cloned into the VM. The zygote and similar core/kernel processes are among key targets for attackers.

This threat is addressed by secured applications, according to embodiments of the invention, which include native code for running a proprietary virtual machine (VM) (implementing the "second process virtual machine" described elsewhere herein) that provides a new protection layer for the original application code. The proprietary VM can hide sensitive parts of the application code from the eyes of decompilers and runtime inspection. This hiding is referred to as "vaulting" herein. Thus, non-critical parts of the application code can be processed in the standard Android™ VM (which provides a "first process virtual machine" as described elsewhere herein), while security-sensitive elements of the application code are processed in a proprietary VM (also referred to herein as a "vaulted VM"), rather than in the standard Android™ VM. The code which is processed by the proprietary VM vault is no longer visible to decompilers, due to encryption of the code, and it also cannot be inspected at runtime because the proprietary VM does not provide a debug interface.

Figure 3:
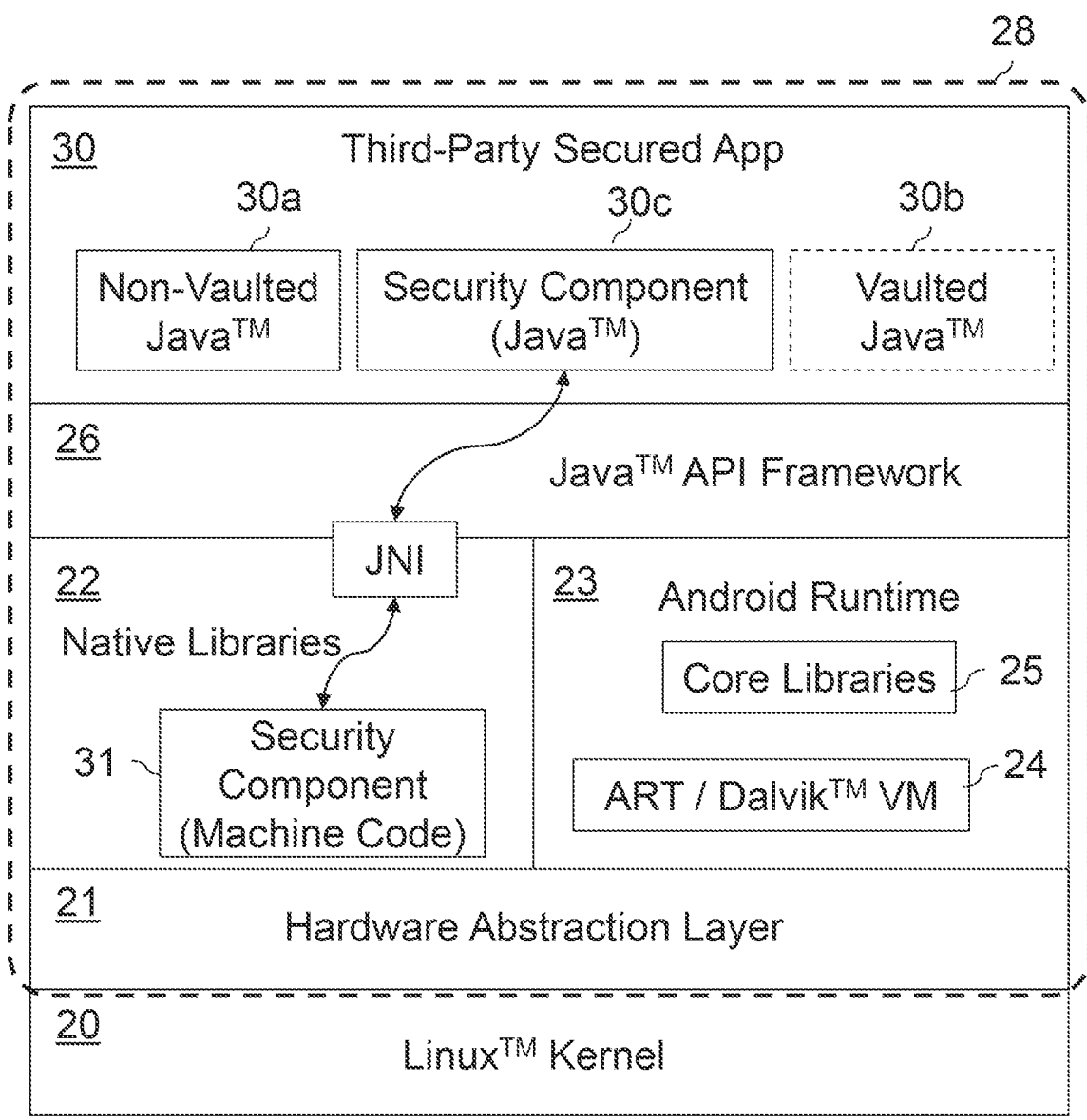
FIG. 3 is a schematic diagram of a secured app, embodying the invention, loaded on an Android™ platform.
Figure 4:
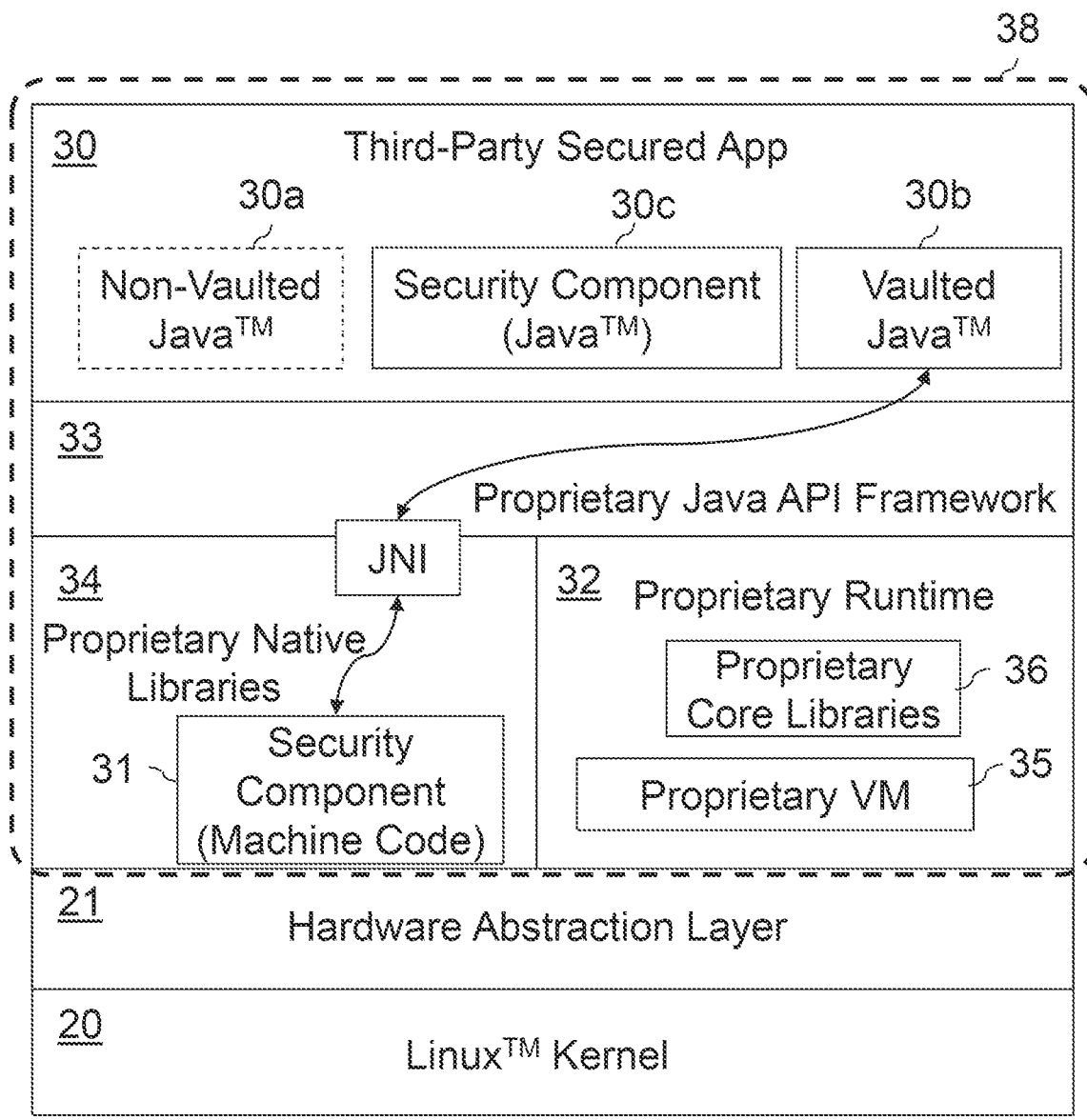
FIG. 4 is a schematic diagram of software components running within a second process, created by the secured app.

FIGS. 3 & 4 show a third-party secured application 30 loaded onto the Android™ platform. The application 30 is executed across two separate Linux™ processes 28, 38. FIG. 3 shows the software components that are executed in a first process 28, while FIG. 4 shows the software components that are relevant to a second process 38, which is forked from the first process 28.

The secured application 30 contains both bytecode 30a, 30b, 30c and machine code 31. The two parts may interface using the Java™ Native Interface (JNI) framework. In order to support multiple platforms, the secured application may contain multiple versions of the machine code, compiled from the same or similar source code but for different types of processor (e.g., for ARM™, ARM64™ and x86 instruction sets). The machine code 31 includes the appropriate code for interpreting or compiling bytecode within a proprietary VM 35, which can run alongside a standard Android™ VM 24, but in a separate process 38. The bytecode 30a, 30b, 30c includes both non-vaulted code 30a, for processing by the standard Android™ VM 24, and vaulted code 30b, for processing by the proprietary VM 35.

A security component (comprising a Java™ portion 30c and a native-code portion 31) within the secured application 30 is responsible for initialising the proprietary runtime 32 and VM 35 when required. It may do this, for example, by instructing the Android™ VM 24 to call a machine-code library 31 within the security component 30c, 31 which contains a Linux™ fork( ) call followed by a Linux™ exec ( ) call. This creates a second process 38.

The proprietary VM 35 is then run in this second process 38 (i.e., in a separate execution environment), separate from the first process 28 which continues to run the Android™ VM 24.

The Linux™ exec( ) call results in substantially all of the program code from the first, Android™ VM process 28 being cleared from the memory of the second process 38, and replaced with program code supplied by the security component 31. This program code creates the proprietary VM 35. It can also provide proprietary versions of some or all of the standard Android™ frameworks 33 and system libraries 34 that the vaulted code may require, to further reduce the risk of security compromise. (Although FIG. 4 illustrates the case where there is complete replacement with proprietary code, in some embodiments some pre-installed libraries may be retained, for reasons of efficiency.)

In some instances, some device-dependent drivers from the hardware abstraction layer 21 may need to be retained in memory. However, to improve security further, the bytecode 30a, 30b may be partitioned so that the vaulted Java™ 30b does not need to access any low-level hardware functions and so does not require any driver access within the second process 38.

The machine code 31 performs an integrity check on the new process 38, by scanning the memory allocated to the process 38 for any unrecognised code. If it detects unusual code, it may halt execution or alert the user.

The proprietary VM 35 may contain a real-time interpreter, or it may perform JIT or AOT compilation, or it may support a mixture of these approaches. It supports the same basic Java-like bytecode as the standard Android™ VM 24. This makes the processing of securing an application very straightforward for the application developer, who is not required to undertake any additional native coding.

The proprietary VM 35 processes bytecode from the vaulted Java™ 30b of the secured app 30, within the second Linux™ process 38, while the original Android VM 24 continues to process bytecode from the non-vaulted Java™ 30a of the secured app 30, within the original first Linux™ process 28. Vaulted Java™ bytecode 30b is not processed within the first process 28, and non-vaulted bytecode 30a is not processed within the second process 38. Communication between the non-vaulted Java 30a and the vaulted Java 30b occurs using proxies, as described below.

Figure 5:
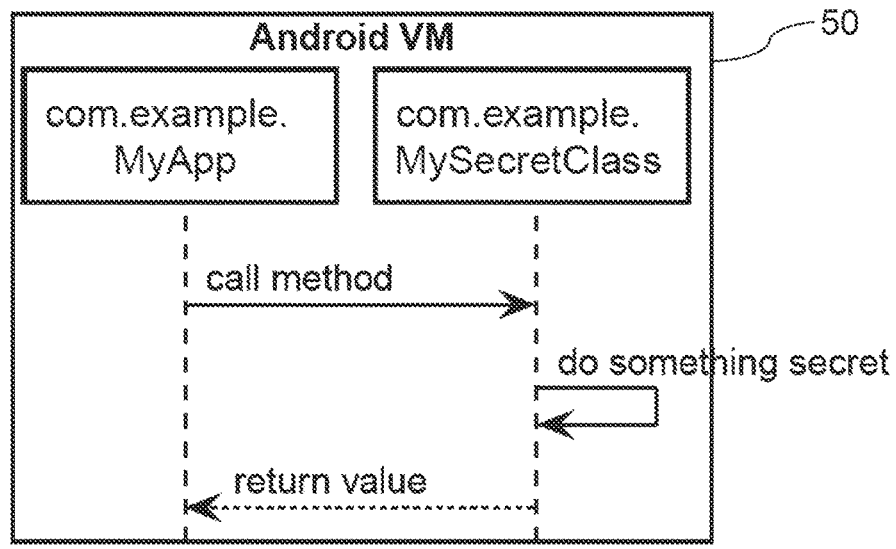
FIG. 5 is a schematic diagram illustrating a conventional approach to processing an app on an Android™ platform.

FIGS. 4 & 5 show an example application com.example.MyApp which uses a class com.example.MySecretClass.

In FIG. 5, the entire application is processed in the standard Android™ VM 50, in the conventional way. The secret actions of the class MySecretClass are vulnerable to compromise by static and dynamic analysis.

Figure 6:
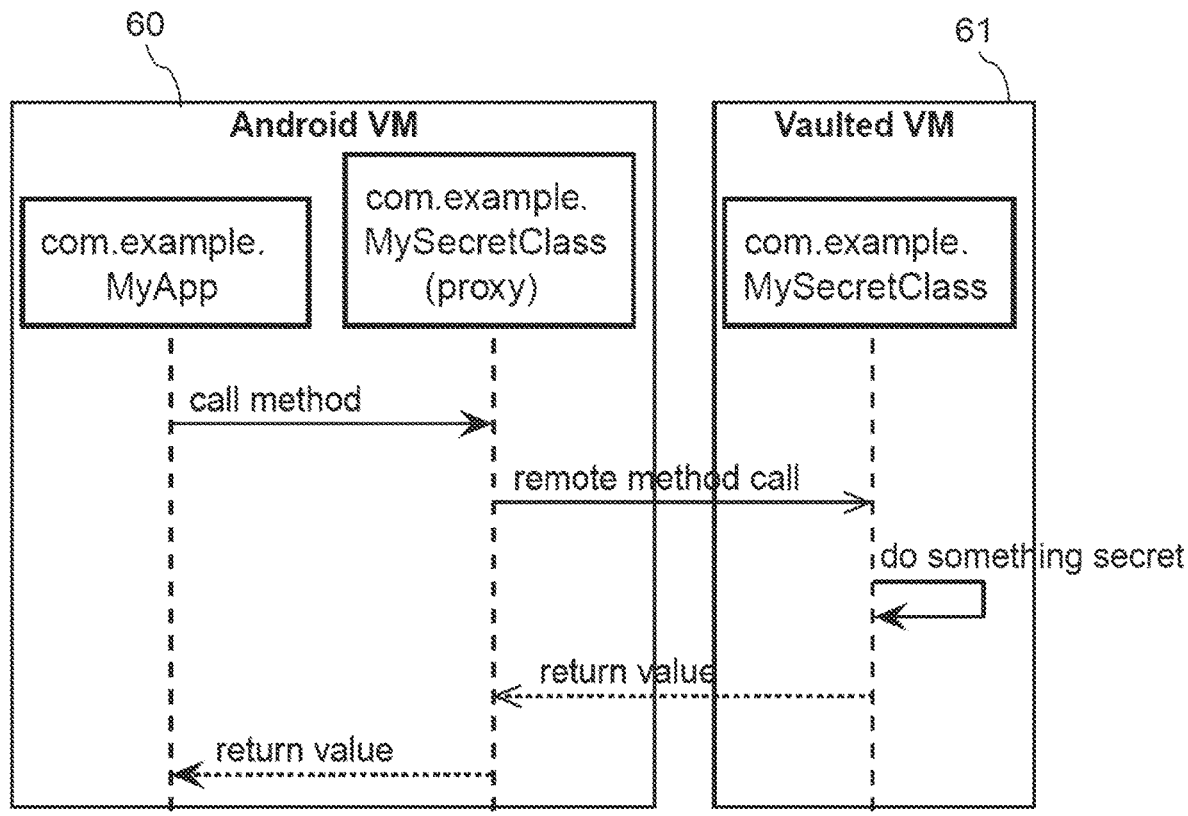
FIG. 6 is a schematic diagram illustrating the execution of a secured app, embodying the invention, on an Android™ platform.

By contrast, in FIG. 6, the application has been secured by dividing the application bytecode into two parts: main code which is processed in the standard Android™ VM 50, and vaulted code which is processed in a proprietary vaulted VM 61. The native machine code for executing the proprietary VM 61 is incorporated into the secured application, so that it is self-contained. In this example, the class MySecretClass has been set to execute in the proprietary vaulted VM 61. A proxy class for MySecretClass is processed in the standard Android™ VM 60. This proxy class does not contain the security-sensitive code, but merely provides an interface to the substantive MySecretClass class, which is processed in the proprietary VM 61. Because the class MySecretClass is run inside the proprietary VM 61, and is only stored outside the proprietary VM in encrypted form (to be decrypted within the proprietary VM 61), it can be hidden from static and dynamic analysers.

In general, for any secured applications, interaction between the application bytecode that remains in the Android™ VM 60 and the shielded bytecode, processed by the vaulted VM 61, is realised through "proxies". A "proxy class" is a representation in the Android™ VM of the "real class" in the vaulted VM, or vice versa. A proxy class declares the same public methods as the real class, but its methods are implemented as remote function calls. A "proxy object" is an instance of a proxy class in the Android™ VM that represents the "real object" in the vaulted VM, or vice versa. Calling a method on a proxy object executes a remote function call which calls the function on the real object in the other VM.

The vaulted code is stored encrypted. The vaulted code is decrypted on starting the vaulted VM. Thus it is not possible to decompile the vaulted code using tools like apktool.

The vaulted VM does not implement a Java™ debugger API. Thus it is not possible to attach a Java™ debugger to the vaulted code. The main code, which is processed in the Android™ VM 60, may be protected by adding code for actively blocking a Java™ debugger in the secured application. This is not necessary for the vaulted code.

The secured application is set to run the vaulted VM 61 in a process with restricted privileges, so as to provide still greater security.

The vaulted code adds an additional binding between the main code and the vaulted VM 61 because, if the vaulted VM 61 is not executing correctly, the main application code is unable to execute the remote method calls to the vaulted code.

Securing an Application

In some embodiments, a secured application is generated in two steps.

Figure 7:
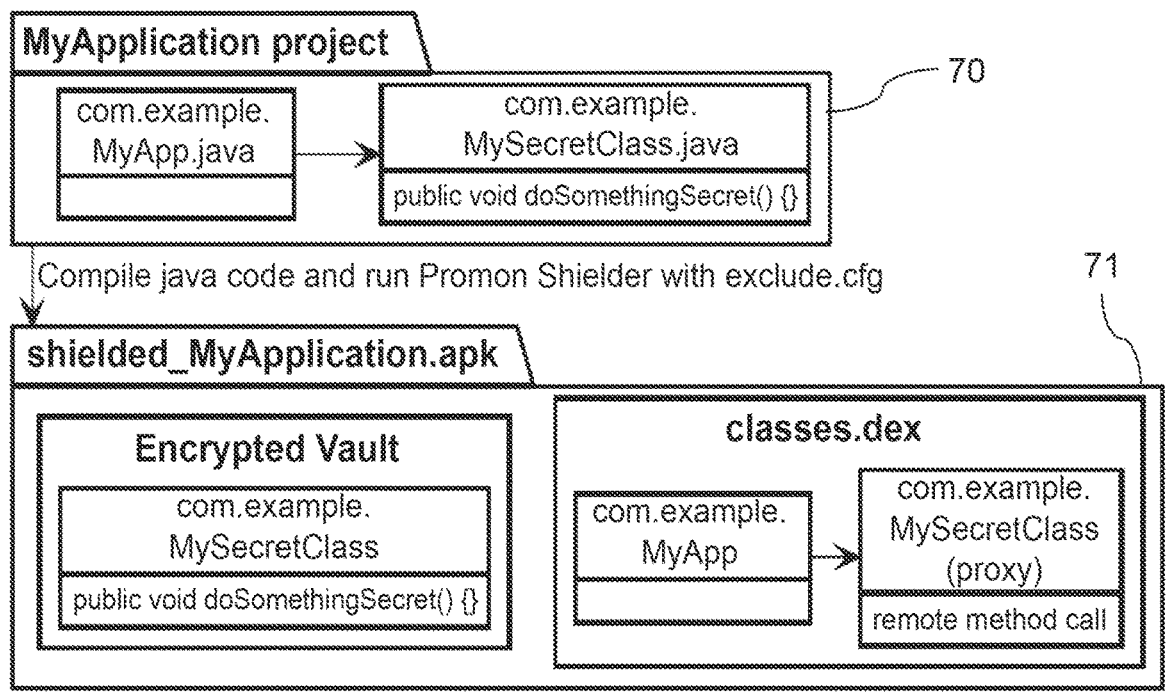
FIG. 7 is a schematic diagram of a compilation process for a secured app, embodying the invention.

As illustrated in FIG. 7, first, an application project 70 with the desired functionality (e.g., an online banking app) is developed, compiled and tested in the normal way. Second, a novel securing or "shielding" process is used to convert the unsecured application into a secured application 71.

Once the application has been tested, a programmer selects classes that are to be hidden for processing by the vaulted VM. These will typically be classes that handle security-sensitive data or operations.

In the example of FIG. 6, the class com.example.MySecretClass is configured to be vaulted.

The shielding tool may be a standalone tool or a proprietary Gradle plugin. It automatically moves the bytecode of the vaulted class "com.example.MySecretClass" to a "vault" within the secured application by encrypting the bytecode and marks it for processing by the vaulted VM. It replaces the code with a proxy class in the classes.dex of the main, non-vaulted application.

The shielding process may be carried out in a development environment, e.g., on a Microsoft™ Windows™ PC; it would not typically be performed on the target device 1.

Copies of the secured application can then be distributed to users through normal channels—e.g., as a download from an online app store.

The shielding processes places some limitations on the code. For example:

- non-vaulted code may only call public methods on public vaulted classes or interfaces;
- the return type or argument types of the public vaulted methods, called by non-vaulted code, are restricted to "vault-serializable" types, as described below;
- vaulted code may only call methods on vaulted classes or interfaces (the vaulted VM carries its own core Java™ classes which vaulted code may use);
- a non-vaulted class may not inherit from a vaulted class;
- a non-vaulted interface may extend a vaulted interface; and
- a non-vaulted class may implement a vaulted interface as long as the return type or argument types of the implemented interfaces methods are "vault-serializable" types, as described below.

Thus an instance of a non-vaulted class which implements a vaulted interface may be passed as an argument to a method of a vaulted class.

If the shielding tool detects that some part of the application code does something that is not allowed for the vaulted VM, it will report an error and stop securing the application.

When passing arguments to a remote method call or when returning a value from that call, the argument values and return value are serialized and transported inside a message between the Android™ VM and the vaulted VM.

The following types are vault serializable:

- void (as a return type);
- boolean, byte, char, double, float, int, long, short (values of these types are naturally serialized through their native binary representation);
- java.lang.Boolean, java.lang.Byte, java.lang.Character, java.lang.Double, java.lang.Float, java.lang.Integer, java.lang.Long, java.lang.Short (values of these types are serialized like their corresponding primitive value);
- java.lang.String, java.math.BigDecimal, java.math.BigInteger (these types are all immutable types, which are classes that cannot be modified after creating an instance of that class);
- a public interface or public class of any vaulted class (an instance of these classes is serialized as an object reference; the other VM 60, 61 creates a proxy instance of a matching proxy class on receiving such a reference); and
- an array of any of the above mentioned types, e.g., byte [ ] or String[ ].

The vaulted VM 61 carries its own core Java™ classes, contained within the secured application, which vaulted code may use. These will typically include at least some of the APIs from:

java.lang.*;
java.math.*;
java.text.*; and
java.util.*.

Example: RSA Encryption

An example will now be presented of securing an application that uses RSA encryption to secure a communication channel. Although the example is simplified for ease of explanation, the app could, for example, be a complex messaging app which uses RSA encryption to receive encrypted messages from a remote party, or any other security-dependent application.

In this example, the class java.math.BigInteger is used to implement a basic RSA encryption without padding.

The original unsecured application performs the following steps (potentially among many other operations):
generating an RSA key-pair;
passing the public RSA key to an external service;
receiving a message, encrypted with the public RSA key, from the external service; and
decrypting and handling the message.

The application defines the following classes and interface:
class MyApplication is the main entry point for this example;
class EncryptedMessageHandler owns the application's RSAKeyPair and has the ability to decrypt a message and process the decrypted message;
public interface RSAPublicKey for accessing the public RSA key;
interface RSAPrivateKey for accessing the private RSA key;
interface RSAKeyPair for storing the public and private keys;
class RSAKeyGenerator to generate a new RSAKeyPair;
class RSA.java with static methods to decrypt a cipher text or encrypt a message;
class RSAImpl which provides implementations for the interfaces RSAPublicKey, RSAPrivateKey and RSAKeyPair.

The class ExternalService is referenced as an exemplary class that can receive a public RSA key and return an encrypted message to the class MyApplication. No actual code is provided in this example. However the class might, for example, send the public key to a remote party over a radio link, and receive a message, encrypted with the key, over the radio link in response.

Defining Classes to Hide in the Vaulted VM

To protect the private key and the algorithm to process the decrypted message, the application can hide, in the vaulted VM, the parts that decrypt the message and that handle the decrypted message.

The original bytecode classes are divided as follows:

| Android ™ VM | Vaulted VM |
|---|---|
| class MyApplication | public class EncryptedMessageHandler |
| class ExternalService | public interface RSAPublicKey |
| | public interface RSAPrivateKey |
| | public interface RSAKeyPair |
| | public class RSA (encrypt, decrypt) |
| | class RSAKeyGenerator |
| | class RSAImpl |

Figure 8:
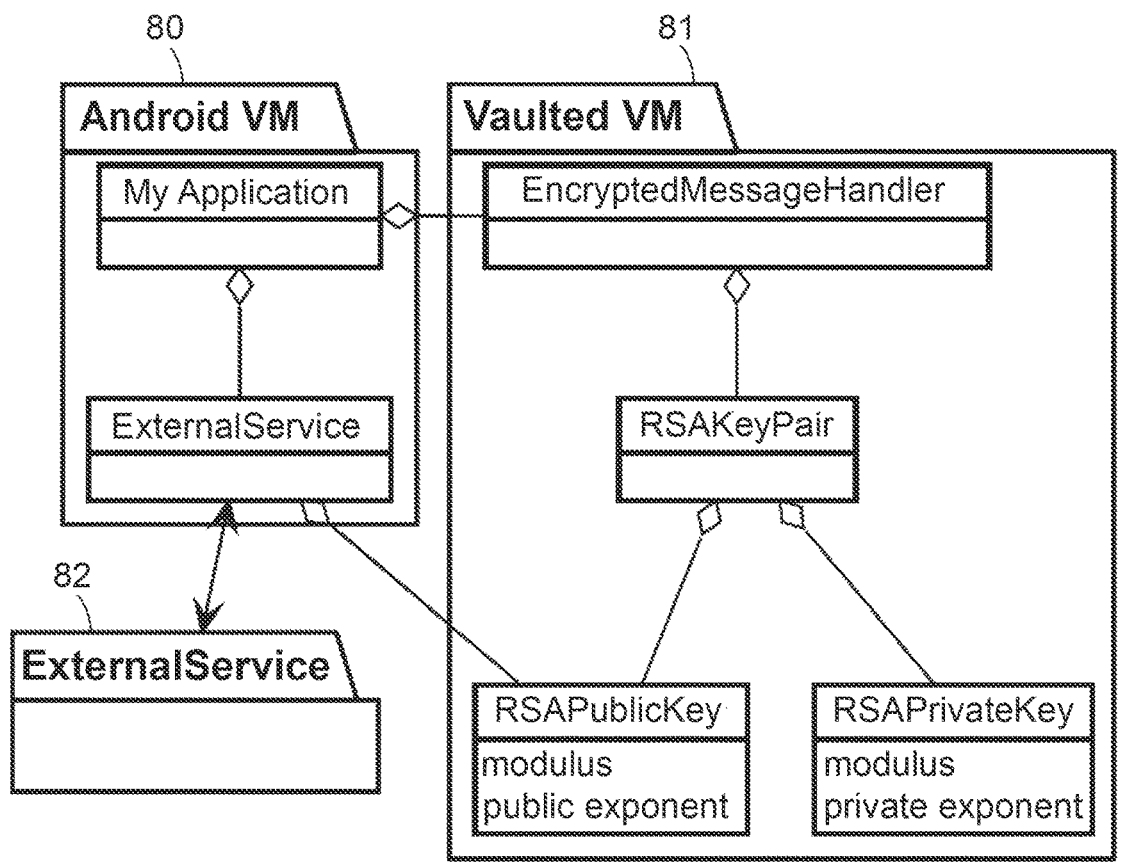
FIG. 8 is a schematic diagram of relations between objects involved in an RSA encryption operation in a secured app embodying the invention.

FIG. 8 shows how the objects are split between the Android™ VM 80 and the vaulted VM 81 after the application is loaded onto a device 1.

The class MyApplication which lives in the Android™ VM 80 has a reference to the EncryptedMessageHandler and can call its public methods (e.g., getPublicKey( )), but the EncryptedMessageHandler object remains in the vaulted VM 81 along with all the sensitive key data. In this way the private key and the algorithm to decrypt and handle the message are protected from malicious attack.

The ExternalService 82, which could be executed in another Android™ VM on the device 1, or which could be a service remote from the device 1, receives a copy of the public key and knows how to encrypt a message for the EncryptedMessageHandler.

In this example, all classes inside the package named com.my.example.vault should be configured to be vaulted, by the programmer.

Message Flow—Initialization

Figure 9:
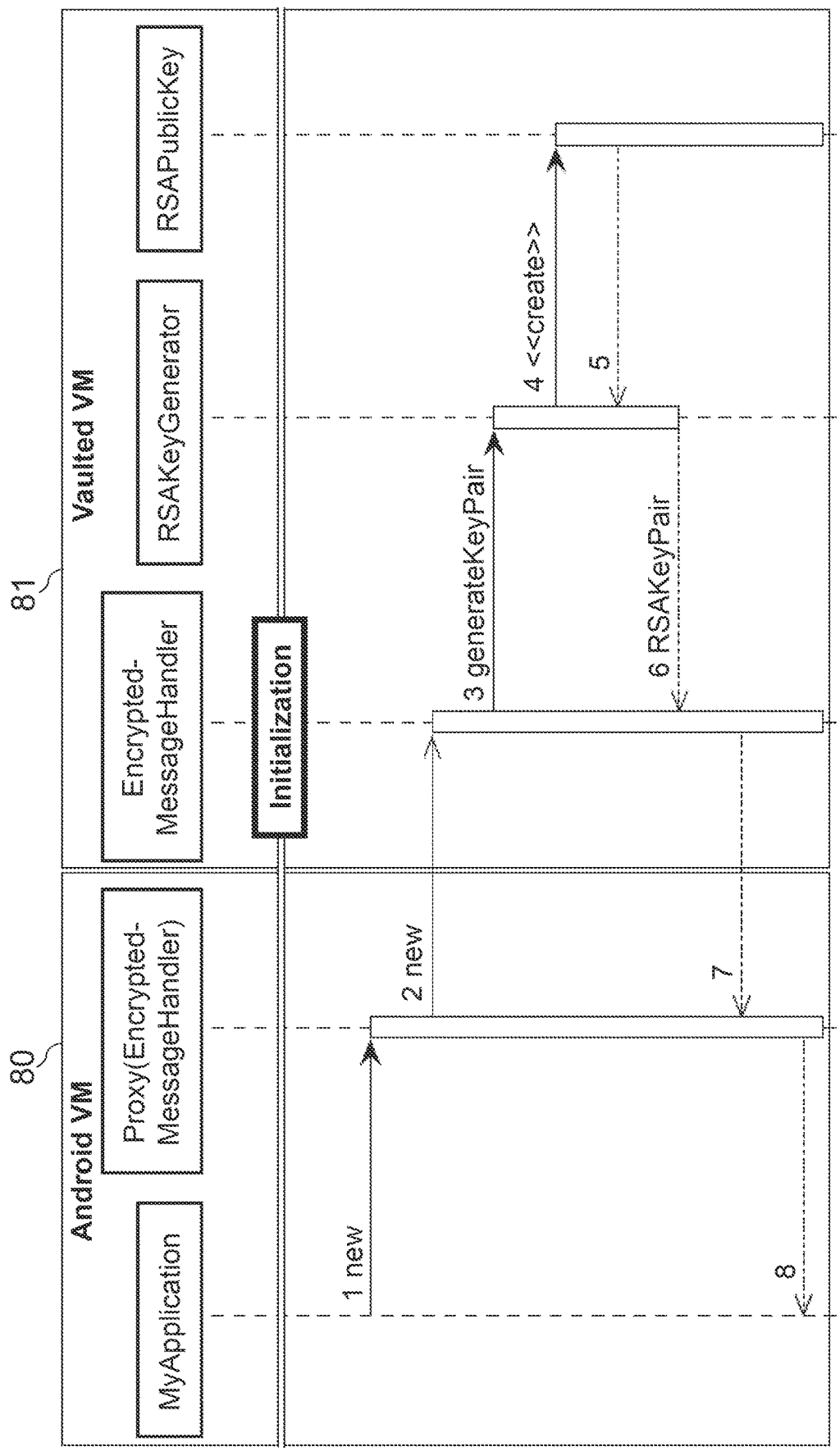
FIG. 9 is a schematic diagram of message flows in an initialisation stage of the RSA encryption operation.

FIG. 9 shows the message flow when the application is initialized on the device 1, which comprises the following steps:

1. MyApplication calls new EncryptedMessageHandler( ), which creates a new proxy of the real EncryptedMessageHandler in the vaulted VM 81.
2. The proxy sends a request to the vaulted VM to create the real EncryptedMessageHandler.
3. The EncryptedMessageHandler calls the RSAKeyGenerator to generate a new RSAKeyPair.
4. The RSAKeyGenerator creates a new RSAPublicKey (and a new RSAPrivateKey which is not illustrated in FIG. 9).
5. The RSAKeyGenerator stores the public key in a new RSAKeyPair.
6. The RSAKeyGenerator returns the RSAKeyPair to the EncryptedMessageHandler, which stores the RSAKeyPair instance as a member.
7. A reference to the real EncryptedMessageHandler is returned to the proxy.
8. MyApplication stores the proxy as a member.

At this point the Android™ VM 80 has only an instance of MyApplication and a proxy instance for EncryptedMessageHandler. The proxy instance has no fields and its methods are implemented by forwarding method calls.

The real EncryptedMessageHandler with the generated RSA key pair and the real method implementation is only inside the vaulted VM 81.

Message Flow—Accessing the Public RSA Key

Figure 10:
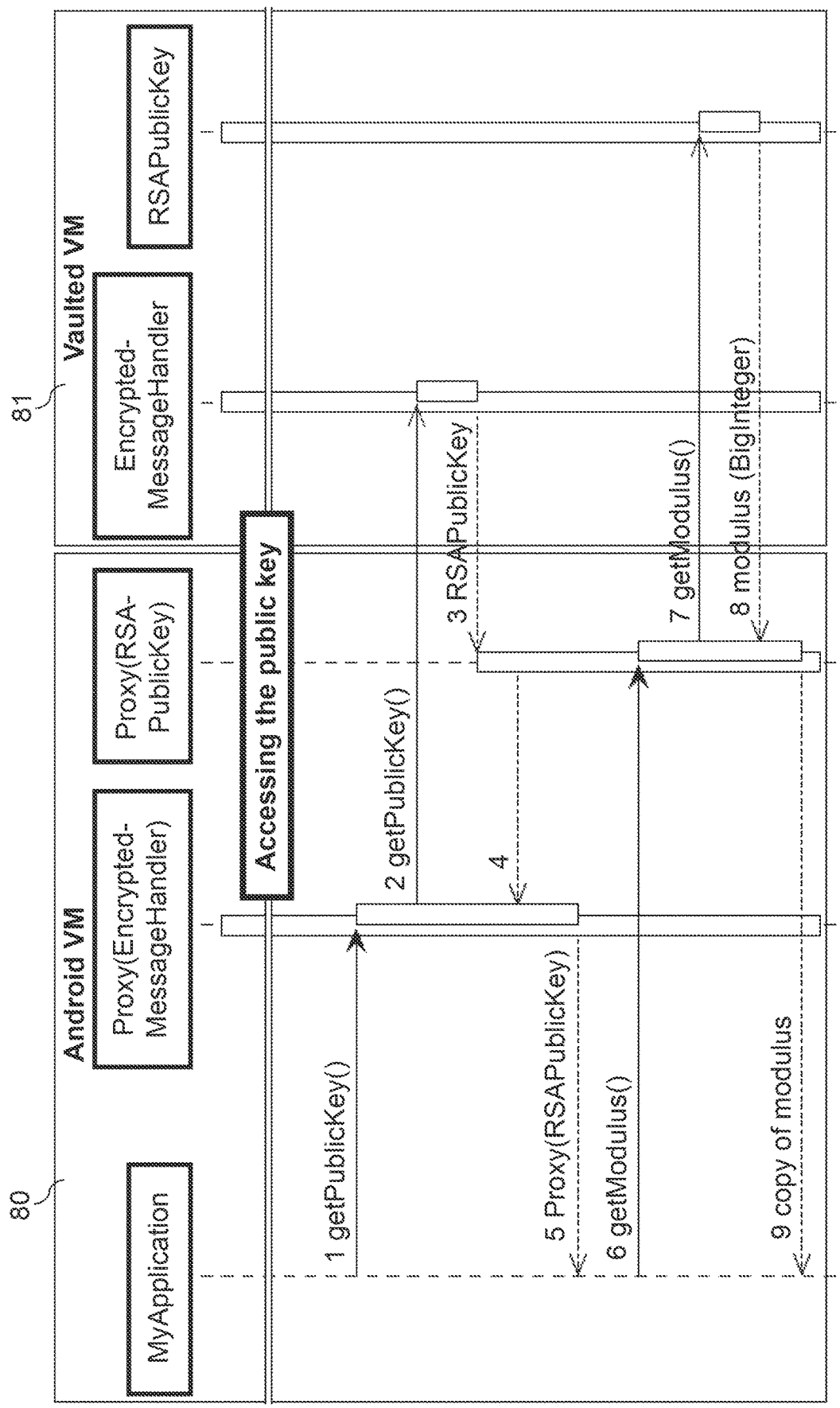
FIG. 10 is a schematic diagram of message flows in a key-retrieval stage of the RSA encryption operation.

FIG. 10 shows the message flow for retrieving the public RSA key from the EncryptedMessageHandler, which comprises the following steps:

1. MyApplication calls EncryptedMessageHandler.getPublicKey( ) on the EncryptedMessageHandler proxy instance.
2. The proxy sends the method call as message to the real EncryptedMessageHandler.
3. The real EncryptedMessageHandler returns a reference to its RSAPublicKey member as a message to its proxy. On returning the RSAPublicKey reference from the vaulted VM 81 to the Android™ VM 80, a proxy for the RSAPublicKey is created.
4. The RSAPublicKey proxy instance is returned to the proxy method EncryptedMessageHandler.getPublicKey( ).
5. The proxy method EncryptedMessageHandler.getPublicKey( ) returns the proxy instance of the RSAPublicKey to MyApplication.

The proxy for the real RSAPublicKey instance, which is owned by the real EncryptedMessageHandler in the vaulted VM 81, is thus created when it is requested by MyApplication.

Now MyApplication serializes the modulus and exponent of the public RSA key, to send it to the external service 82, by performing the following steps:

6. MyApplication calls RSAPublicKey.getModulus( ) on the proxy RSAPublicKey instance.
7. The RSAPublicKey proxy sends the method call as a message to its real instance in the vaulted VM 81.

8. The real RSAPublicKey instance returns the modulus as a BigInteger to the proxy. On passing a BigInteger instance from the vaulted VM 81 to the Android™ VM 80, a copy of that instance is created.

9. The copy of the modulus is returned to MyApplication.

The modulus is thus returned as copy to the caller. The modulus uses type java.math.BigInteger which is a class for an immutable arbitrary-precision signed integer. Since a BigInteger is immutable, it is not necessary to keep a reference to its original instance in the vaulted VM 81.

Message Flow—Decrypting and Handling a Message

Figure 11:
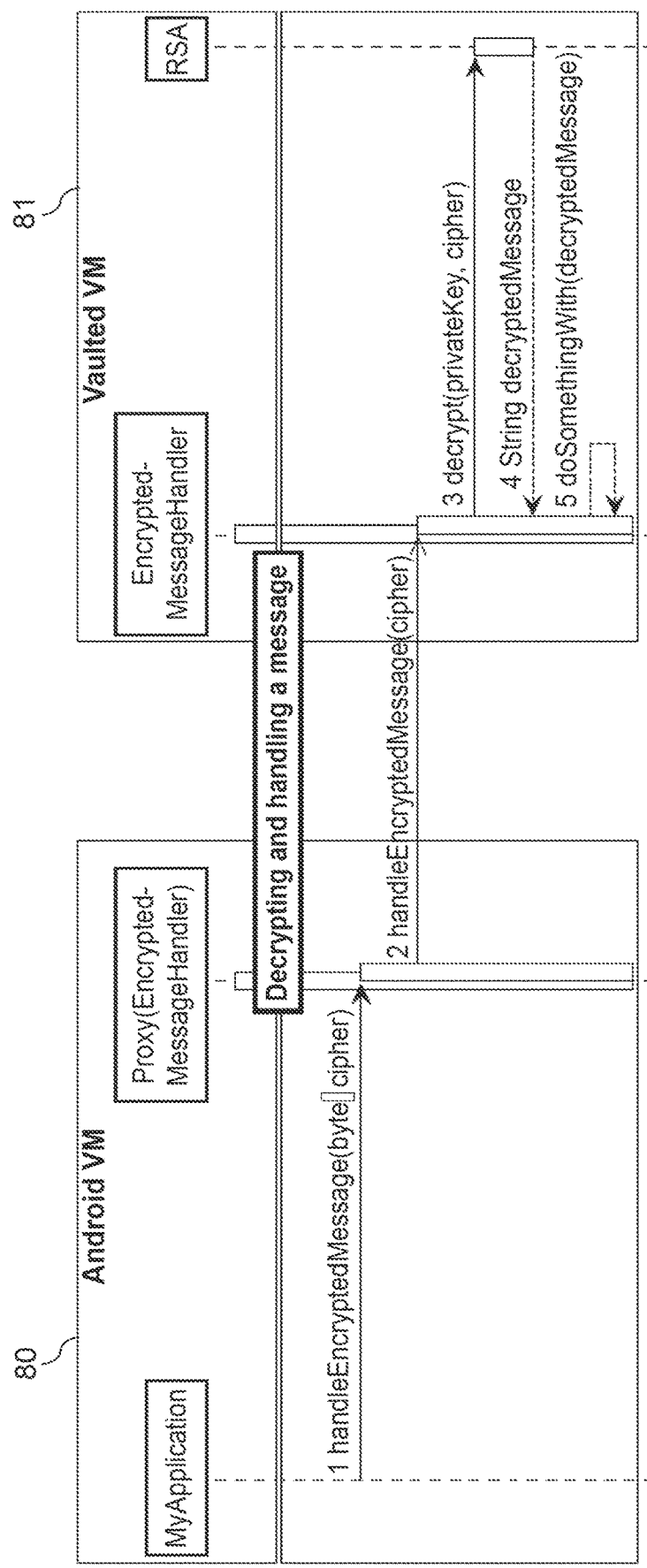
FIG. 11 is a schematic diagram of message flows in a decryption stage of the RSA encryption operation.

FIG. 11 shows the message flow when decrypting and handling a message, which comprises the following steps:

1. When MyApplication receives an encrypted message, it calls EncryptedMessageHandler.handleEncryptedMessage( ) on its proxy instance, passing the cipher text as argument.

2. The proxy EncryptedMessageHandler passes the cipher text argument in the method call to the real EncryptedMessageHandler in the vaulted VM 81.

3. The real EncryptedMessageHandler uses its private key to decrypt the cipher text (calling RSA.decrypt( )).

4. RSA.decrypt( ) returns the decrypted message to handleEncryptedMessage( ) in the real EncryptedMessageHandler.

5. The real EncryptedMessageHandler can now handle the decrypted message.

Thus, neither the private key nor the decrypted message leave the vaulted VM 81. Of course, if the application wants to do something with the message that has some effect on the application, then some value may need to be returned to the application in the Android™ VM 80.

Code Listing

The following class is processed in the Android™ VM 80:

```
com.my.example.MyApplication.java
    package com.my.example;
    import com.my.example.vault.EncryptedMessageHandler;
    import com.my.example.vault.rsa.RSAPublicKey;
    public class MyApplication {
      private final EncryptedMessageHandler encryptedMessageHandler;
      private ExternalService externalService;
      public MyApplication( ) {
        encryptedMessageHandler = new Encryptedmessagehandler( );
      }
      public setExternalService(ExternalService externalService) {
        this.externalService = externalService;
      }
      public void sendPublicKeyToExternalService( ) {
        RSAPublicKey publicKey = encryptedMessageHandler.
            getPublicKey( );
        externalService.sendPublicKey(serializePublicKey(publicKey));
      }
      private String serializePublicKey(RSAPublicKey publicKey) {
        return new StringBuilder( )
            .append("public-key:")
            .append("e=").append(publicKey.getPublicExponent( ).toString( ))
            .append(",m=").append(publicKey.getModulus( ).toString( ))
            .toString( );
      }
      public void onEncryptedMessageReceived(byte[ ] cipher) {
        encryptedMessageHandler.handleEncryptedMessage(cipher);
      }
    }
```

The following classes are processed in the vaulted VM 81:

```
com.my.example.vault.EncryptedMessageHandler.java
    package com.my.example.vault;
    import com.my.example.vault.rsa.RSA;
    import com.my.example.vault.rsa.RSAKeyGenerator;
    import com.my.example.vault.rsa.RSAKeyPair;
    import com.my.example.vault.rsa.RSAPublicKey;
    public class EncryptedMessageHandler {
      private final static int RSA_KEY_LENGTH = 2048;
      private final RSAKeyPair rsaKeyPair;
      public EncryptedMessageHandler( ) {
        rsaKeyPair = RSAKeyGenerator.generateKeyPair(RSA_KEY_LENGTH);
      }
      public RSAPublicKey getPublicKey( ) {
        return rsaKeyPair.getPublicKey( );
      }
      public void handleEncryptedMessage(byte[ ] cipher) {
        String decryptedMessage = RSA.decrypt(rsaKeyPair.getPrivateKey( ), cipher);
        doSomethingWith(decryptedMessage);
      }
    }
com.my.example.vault.rsa.RSAPublicKey.java
    package com.my.example.vault.rsa;
    import java.math.BigInteger;
    public interface RSAPublicKey {
      BigInteger getModulus( );
      BigInteger getPublicExponent( );
    }
com.my.example.vault.rsa.RSAPrivateKey.java
    package com.my.example.vault.rsa;
    import java.math.BigInteger;
    public interface RSAPrivateKey {
      BigInteger getModulus( );
      BigInteger getPrivateExponent( );
    }
com.my.example.vault.rsa.RSAKeyPair.java
    package com.my.example.vault.rsa;
    public interface RSAKeyPair {
      RSAPublicKey getPublicKey( );
      RSAPrivateKey getPrivateKey( );
    }
com.my.example.vault.rsa.RSA.java
    package com.my.example.vault.rsa;
```

```
import java.math.BigInteger;
public class RSA {
    public static byte[ ] encrypt(RSAPublicKey publicKey, String message) {
        return new BigInteger(message.getBytes( ))
            .modPow(publicKey.getPublicExponent( ), publicKey.getModulus( ))
            .toByteArray( );
    }
    public static String decrypt(RSAPrivateKey privateKey, byte[ ] cipher) {
        return new String(new BigInteger(cipher)
            .modPow(privateKey.getPrivateExponent( ), privateKey.getModulus( ))
            .toByteArray( ));
    }
}
com.my.example.vault.rsa.RSAKeyGenerator.java
    package com.my.example.vault.rsa;
    import java.math.BigInteger;
    import java.util.Random;
    public class RSAKeyGenerator {
    /**
    * Computes the least common multiple.
    *
    * lcm(a,b) = |a*b| / gcd(a, b) = (|a| / gcd(a,b)) * |b|.
    *
    * @return the least common multiple of a and b.
    */
    private static BigInteger lcm(BigInteger a, BigInteger b) {
        return a.abs( ).divide(a.gcd(b)).multiply(b.abs( ));
    }
    /**
    * Generates a keysize-bit RSA public/private key pair.
    * See https://en.wikipedia.org/wiki/RSA_(cryptosystem)#Code
    *
    * @param keysize is the bit length of desired RSA modulus n (should be even).
    * @return An RSA key pair.
    */
    public static RSAKeyPair generateKeyPair(int keysize) {
        Random random = new Random( );
        BigInteger p;
        BigInteger q;
        BigInteger lambda;
        // generate p and q such that λ(n) = lcm(p-1, q-1) is coprime with e
        // and |p-q| >= 2^(keysize/2-100)
        do {
            p = new BigInteger(keysize / 2, random).nextProbablePrime( );
            q = new BigInteger(keysize / 2, random).nextProbablePrime( );
            lambda = lcm(p.subtract(BigInteger.ONE), q.subtract(BigInteger.ONE));
        } while (!RSAImpl.PublicKey.EXPONENT.gcd(lambda).equals(BigInteger.ONE) ||
            p.subtract(q).abs( ).shiftRight(keysize / 2-100)
                .equals(BigInteger.ZERO));
        BigInteger n = p.multiply(q);
        BigInteger d = RSAImpl.PublicKey.EXPONENT.modInverse(lambda);
        return new RSAImpl.KeyPair(
            new RSAImpl.PublicKey(n), new RSAImpl.PrivateKey(d, n));
    }
}
com.my.example.vault.rsa.RSAImpl.java
    package com.my.example.vault.rsa;
    import java.math.BigInteger;
    class RSAImpl {
        static class PublicKey implements RSAPublicKey {
        public static final BigInteger EXPONENT = new BigInteger("65537");
        private BigInteger modulus;
        PublicKey(BigInteger modulus) { this.modulus = modulus; }
        @Override public BigInteger getModulus( ) { return modulus; }
        @Override public BigInteger getPublicExponent( ) { return EXPONENT; }
    }
    static class PrivateKey implements RSAPrivateKey {
        private BigInteger exponent;
        private BigInteger modulus;
        PrivateKey(BigInteger exponent, BigInteger modulus) {
            this.exponent = exponent;
            this.modulus = modulus;
        }
        @Override public BigInteger getModulus( ) { return modulus; }
        @Override public BigInteger getPrivateExponent( ) { return exponent; }
    }
    static class KeyPair implements RSAKeyPair {
        private RSAPublicKey publicKey;
        private RSAPrivateKey privateKey;
```

```
KeyPair(RSAPublicKey publicKey, RSAPrivateKey privateKey) {
    this.publicKey = publicKey;
    this.privateKey = privateKey;
}
@Override public RSAPublicKey getPublicKey( ) { return publicKey; }
@Override public RSAPrivateKey getPrivateKey( ) { return privateKey; }
}
}
```

It will be appreciated by those skilled in the art that the invention has been illustrated by describing one or more specific embodiments thereof, but is not limited to these embodiments; many variations and modifications are possible, within the scope of the accompanying claims.

In particular, the methods for securing software applications may be applied to future Android™ platforms that use future successor VM's to the ART. They may also be applied on non-Android™ platforms, such as on platforms supporting .NET Framework Common Language Runtime virtual machines.

The invention claimed is:

1. A computer-implemented method for generating a secured software application, the method comprising:
  receiving a source software application that comprises instructions for processing by a process virtual machine; and
  generating a secured software application comprising a first set of bytecode instructions derived from the source software application, a second set of the bytecode instructions derived from the source software application, and a security component,
wherein the first set of bytecode instructions are for processing on a first process virtual machine, in a first process, on a target processing system, and
wherein the security component comprises instructions which, when executed on the target processing system, will cause the target processing system to:
  provide a second process virtual machine in a second process, distinct from the first process; and
  process instructions from the second set of bytecode instructions on the second process virtual machine and
wherein the security component further comprises at least one of the following:
  A) instructions that, when executed in the first process, will cause the target processing system to: create the second process by forking the first process; clear all program code from memory associated with the second process; and load new program code to the memory associated with the second process;
  B) a plurality of sets of machine-code instructions for interpreting or compiling bytecode, wherein each set of machine-code instructions for interpreting or compiling bytecode is compiled for execution by a different respective target processing system;
  C) instructions for causing the target processing system to check the integrity of the second process by verifying that some or all memory allocated to the second virtual machine does not contain unrecognised code; and
  D) instructions for causing the target processing system to provide one or more proxy components on the first or second process virtual machine, wherein the one or more proxy components are arranged to allow bytecode instructions being processed on one of the first and second process virtual machines to access a function or object on the other of the first and second process virtual machines.

2. The computer-implemented method of claim 1, wherein the first set of bytecode instructions are for processing on a first process virtual machine that is provided by an operating system of the target processing system.

3. The computer-implemented method of claim 1, wherein the security component comprises instructions that implement the second process virtual machine.

4. The computer-implemented method of claim 1, wherein the security component comprises the instructions that, when executed in the first process, will cause the target processing system to: create the second process by forking the first process; clear all program code from memory associated with the second process; and load the new program code to the memory associated with the second process.

5. The computer-implemented method of claim 1, wherein the security component comprises the plurality of sets of machine-code instructions for interpreting or compiling bytecode, wherein each set of machine-code instructions for interpreting or compiling bytecode is compiled for execution by the different respective target processing system.

6. The computer-implemented method of claim 1, wherein generating the secured software application comprises encrypting the second set of bytecode instructions so that the second set of bytecode instructions are encrypted within the secured software application, and wherein the security component comprises instructions for decrypting the encrypted bytecode instructions on the target processing system.

7. The computer-implemented method of claim 1, wherein the second virtual machine, provided by the security component, does not have a debugging interface.

8. The computer-implemented method of claim 1, wherein the security component comprises the instructions for causing the target processing system to check the integrity of the second process by verifying that some or all memory allocated to the second virtual machine does not contain unrecognised code.

9. The computer-implemented method of claim 1, wherein the security component comprises instructions that implement one or more frameworks or libraries already provided by the target processing system.

10. The computer-implemented method of claim 1, wherein the security component comprises the instructions for causing the target processing system to provide one or more proxy components on the first or second process virtual machine, wherein the one or more proxy components are arranged to allow bytecode instructions being processed on one of the first and second process virtual machines to access the function or object on the other of the first and second process virtual machines.

11. The computer-implemented method of claim 1, wherein the instructions in the source software application are bytecode instructions, and wherein the first and second sets of bytecode instructions in the secured software application together comprise at least 90% of all the bytecode instructions from the source software application.

12. A computer-implemented method for generating a secured software application, the method comprising:
receiving a source software application that comprises instructions for processing by a process virtual machine;
generating a secured software application comprising a first set of bytecode instructions derived from the source software application, a second set of the bytecode instructions derived from the source software application, and a security component, wherein the first set of bytecode instructions are for processing on a first process virtual machine, in a first process, on a target processing system, and wherein the security component comprises instructions which, when executed on the target processing system, will cause the target processing system to provide a second process virtual machine in a second process distinct from the first process and process instructions from the second set of bytecode instructions on the second process virtual machine; and
receiving configuration information that identifies a first set of instructions from the source software application to include in the first set of bytecode instructions, and that identifies a second set of instructions from the source software application to include in the second set of bytecode instructions, and using the configuration information when generating the first and second sets of bytecode instructions.

13. A non-transitory computer readable storage medium storing a software tool for generating a secured software application, the software tool comprising instructions for:
receiving a source software application that comprises instructions for processing by a process virtual machine; and
generating a secured software application comprising a first set of bytecode instructions derived from the source software application, a second set of the bytecode instructions derived from the source software application, and a security component, wherein the first set of bytecode instructions are for processing on a first process virtual machine, in a first process, on a target processing system, and
wherein the security component comprises instructions which, when executed on the target processing system, will cause the target processing system to:
provide a second process virtual machine in a second process, distinct from the first process; and
process instructions from the second set of bytecode instructions on the second process virtual machine and
wherein the security component further comprises at least one of the following:
A) instructions that, when executed in the first process, will cause the target processing system to: create the second process by forking the first process; clear some or all program code from memory associated with the second process; and load new program code to the memory associated with the second process;
B) a plurality of sets of machine-code instructions for interpreting or compiling bytecode, wherein each set of machine-code instructions for interpreting or compiling bytecode is compiled for execution by a different respective target processing system;
C) instructions for causing the target processing system to check the integrity of the second process by verifying that some or all memory allocated to the second virtual machine does not contain unrecognised code; and
D) instructions for causing the target processing system to provide one or more proxy components on the first or second process virtual machine, wherein the one or more proxy components are arranged to allow bytecode instructions being processed on one of the first and second process virtual machines to access a function or object on the other of the first and second process virtual machines.

14. The non-transitory computer readable storage medium of claim 13, wherein the first set of bytecode instructions are for processing on a first process virtual machine that is provided by an operating system of the target processing system.

15. The non-transitory computer readable storage medium of claim 13, wherein the security component comprises instructions that implement the second process virtual machine.

16. The non-transitory computer readable storage medium of claim 13, wherein the security component comprises the instructions that, when executed in the first process, will cause the target processing system to: create the second process by forking the first process; clear some or all program code from memory associated with the second process; and load the new program code to the memory associated with the second process.

17. The non-transitory computer readable storage medium of claim 13, wherein the security component comprises the plurality of sets of machine-code instructions for interpreting or compiling bytecode, wherein each set of machine-code instructions for interpreting or compiling bytecode is compiled for execution by the et different respective target processing system.

18. The non-transitory computer readable storage medium of claim 13, comprising instructions for encrypting the second set of bytecode instructions so that the second set of bytecode instructions are encrypted within the secured software application, wherein the security component comprises instructions for decrypting the encrypted bytecode instructions on the target processing system.

19. The non-transitory computer readable storage medium of claim 13 wherein the second virtual machine, provided by the security component, does not have a debugging interface.

20. The non-transitory computer readable storage medium of claim 13, wherein the security component comprises the instructions for causing the target processing system to check the integrity of the second process by verifying that some or all memory allocated to the second virtual machine does not contain unrecognised code.

21. The non-transitory computer readable storage medium of claim 13, wherein the security component comprises instructions that implement one or more frameworks or libraries already provided by the target processing system.

22. The non-transitory computer readable storage medium of claim 13, wherein the security component comprises the instructions for causing the target processing system to provide one or more proxy components on the first or second process virtual machine, wherein the one or more proxy components are arranged to allow bytecode instructions being processed on one of the first and second process virtual machines to access the function or object on the other of the first and second process virtual machines.

23. The non-transitory computer readable storage medium of claim 13, wherein the instructions in the source software application are bytecode instructions, and wherein the first and second sets of bytecode instructions in the secured software application together comprise at least 90% of all the bytecode instructions from the source software application.

24. The non-transitory computer readable storage medium of claim 7, wherein the security component comprises one or more instructions for creating the second process as a copy of the first process.

25. A non-transitory computer readable storage medium storing a software tool for generating a secured software application, the software tool comprising instructions for:
receiving a source software application that comprises instructions for processing by a process virtual machine;
generating a secured software application comprising a first set of bytecode instructions derived from the source software application, a second set of the bytecode instructions derived from the source software application, and a security component, wherein the first set of bytecode instructions are for processing on a first process virtual machine, in a first process, on a target processing system, and wherein the security component comprises instructions which, when executed on the target processing system, will cause the target processing system to provide a second process virtual machine in a second process distinct from the first process and process instructions from the second set of bytecode instructions on the second process virtual machine; and
receiving configuration information that identifies a first set of instructions from the source software application to include in the first set of bytecode instructions, and that identifies a second set of instructions from the source software application to include in the second set of bytecode instructions, and to use the configuration information when generating the first and second sets of bytecode instructions.

26. A non-transitory computer readable storage medium storing a secured software application comprising a first set of bytecode instructions, a second set of bytecode instructions, and a security component,
wherein the first set of bytecode instructions are for processing on a first process virtual machine, in a first process, on a target processing system, and
wherein the security component comprises instructions which, when executed on the target processing system, cause the target processing system to:
provide a second process virtual machine in a second process, distinct from the first process; and
process instructions from the second set of bytecode instructions on the second process virtual machine and
wherein the security component further comprises at least one of the following:

A) instructions that, when executed in the first process, will cause the target processing system to: create the second process by forking the first process; clear some or all program code from memory associated with the second process; and load new program code to the memory associated with the second process;

B) a plurality of sets of machine-code instructions for interpreting or compiling bytecode, wherein each set of machine-code instructions for interpreting or compiling bytecode is compiled for execution by a different respective target processing system;

C) instructions for causing the target processing system to check the integrity of the second process by verifying that some or all memory allocated to the second virtual machine does not contain unrecognised code; and D) instructions for causing the target processing system to provide one or more proxy components on the first or second process virtual machine, wherein the one or more proxy components are arranged to allow bytecode instructions being processed on one of the first and second process virtual machines to access a function or object on the other of the first and second process virtual machines.

27. The non-transitory computer readable storage medium of claim 26, wherein the security component comprises the instructions that, when executed in the first process, will cause the target processing system to: create the second process by forking the first process; clear some or all program code from memory associated with the second process; and load the new program code to the memory associated with the second process.

28. The non-transitory computer readable storage medium of claim 26, wherein the security component comprises the plurality of sets of machine-code instructions for interpreting or compiling bytecode, wherein each set of machine-code instructions for interpreting or compiling bytecode is compiled for execution by the different respective target processing system.

29. The non-transitory computer readable storage medium of claim 26, wherein the security component comprises the instructions for causing the target processing system to check the integrity of the second process by verifying that some or all memory allocated to the second virtual machine does not contain unrecognised code.

30. The nun-transitory computer readable storage medium of claim 26, wherein the security component comprises the instructions for causing the target processing system to provide one or more proxy components on the first or second process virtual machine, wherein the one or more proxy components are arranged to allow bytecode instructions being processed on one of the first and second process virtual machines to access the function or object on the other of the first and second process virtual machines.

* * * * *